// Patented Oct. 8, 1946                                                   2,409,080

UNITED STATES PATENT OFFICE 2,409,080

PREPARATION OF ALKYLATED CYCLIC HYDROCARBONS

Carlisle M. Thacker and Richmond T. Bell, Highland Park, Ill., assignors to The Pure Oil Company, Chicago, Ill., a corporation of Ohio No Drawing. Application March 4, 1944,
Serial No. 525,100

17 Claims. (Cl. 260—671)

This invention relates to the preparation of alkylated carbocyclic compounds and more particularly to the preparation of alkylated benzene compounds.

An object of our invention is to prepare alkylated cyclic compounds.

Another object of our invention is to provide a method for preparing alkylated carbocyclic compounds by reaction of alkyl mercaptans or sulfides with carbocyclic compounds.

A further object of the invention is to provide a catalyst capable of promoting the combination of alkyl mercaptans or sulfides with carbocyclic compounds to produce alkylated carbocyclic compounds.

Other objects of our invention will become apparent from the following detailed description.

In accordance with our invention alkyl mercaptans or sulfides, in admixture with one or more carbocyclic compounds, are contacted under proper conditions of time, temperature and pressure, with copper pyrophosphate. The copper pyrophosphate may be used alone or in admixture with carriers or supports, which in themselves may be substantially inert or may be capable of splitting out hydrogen sulfide. As carriers which are substantially inert and are suitable as a catalyst support may be mentioned activated charcoal and pumice. As carriers which are capable of splitting out hydrogen sulfide may be mentioned bauxite and fuller's earth. Where the copper pyrophosphate is supported on a carrier we prefer having the copper pyrophosphate present in amounts of at least 5% by weight and still more preferably in amounts of from 20 to 75% by weight. Catalyst may be used either in powdered, granulated or pelleted form, depending on the nature of the process. Where the catalyst is suspended in either liquid or vapor charging material as in the so-called "fluid catalyst" cracking process, it is preferably used in finely powdered form. Where the catalyst is used as a fixed bed through which the charging materials are passed, it is preferably used in either granulated or pelleted form.

Although our invention is broadly directed to the preparation of alkylated carbocyclic compounds, it is more particularly concerned with the preparation of alkyl benzenes such as monoethyl benzene and isopropyl benzene by the reaction of ethyl or propyl mercaptans with benzene.

In carrying out our process, the reactants are preferably preheated and contacted in admixture with catalyst at a temperature of approximately 200° to 525° C. Space velocities of approximately 10 to 4000 may be used depending on the temperature of the catalyst bed and the pressure under which the process is conducted. Where a bed of catalyst is used, space velocity means the total volume at 0° C. and 760 mm. of mercury pressure of charging gases and/or vapors which pass through a unit volume of catalyst space per hour. Pressures of from approximately atmospheric to 2000 pounds per square inch or higher may be used. Where low space velocities or long reaction periods and high pressures are resorted to, satisfactory results may be obtained by operating at temperatures within the lower portion of the temperature range. At high space velocities or short reaction periods and low pressures, temperatures within the upper portion of the range will be necessary in order to obtain appreciable yields of alkylated cyclic compounds.

The ratio of reactants charged to the process may vary over a wide range. Where it is desired to alkylate benzene by reaction of benzene and alkyl mercaptans, the ratio of benzene to alkyl mercaptan may vary from a molal ratio of 1 to 1 to a molal ratio of 30 to 1, depending upon whether poly- or mono-alkyl benzenes are desired. For the preparation of mono-alkyl benzenes we prefer a ratio of benzene to mercaptan in excess of 1 to 1. Where it is desired to prepare alkyl benzene from benzene and alkyl sulfides the molal ratio may vary from 1 to 1 to a ratio of 60 to 1, although when mono-alkyl benzenes are the desired product we prefer a ratio of benzene to alkyl sulfide in excess of 2 to 1. By maintaining a ratio of benzene to mercaptan or sulfide above the stoichiometric ratio necessary for formation of the mono-alkyl benzene, the reaction tends toward formation of mono-alkyl benzene rather than poly-alkyl benzenes.

Our preferred conditions of operation when preparing mono-ethyl benzene from benzene and ethyl mercaptans and/or sulfide are temperatures within the range of 300° to 425° C., space velocities of 10 to 1000 and pressures of approximately 250 to 500 pounds per square inch gauge.

In carrying out the process side reactions occur resulting in the formation of varying amounts of olefins, alkyl sulfides, hydrogen and hydrogen sulfide. Such olefins as are formed may be recycled to the process together with unreacted carbocyclic compound and unreacted mercaptan and/or sulfide, or the olefin may be recovered and utilized for other purposes. Recirculation of the olefins will improve the yield of alkylated carbocyclic compounds.

Reaction products can be readily fractionated into unreacted charging stock and reaction products. Hydrogen sulfide which forms in the process may be recovered in a desired manner as for example by absorption in triethanolamine followed by stripping. The alkylation products can be freed of hydrogen sulfide, mercaptans and alkyl sulfides by washing with alkali solution and fractional distillation. The alkylation products may be used for various purposes as for example as blending stock in the preparation of high octane motor fuel.

In order to demonstrate the process a number of runs were made in laboratory apparatus using as catalyst activated wood charcoal impregnated with copper pyrophosphate prepared by suspending powdered activated wood charcoal in a solution of copper sulfate and precipitating the copper phosphate by addition of a solution of sodium pyrophosphate. The resulting material was filtered, washed with water and dried at approximately 220° F., after which it was extruded to rods of about .375 inch diameter and broken into pieces of about .5 to 1 inch in length. The resulting pieces were crushed to 8 to 14 mesh size. 250 cc. of the resulting catalyst were packed into a vertical reactor made of 1-inch I. P. S. extra heavy stainless steel tubing. The reactor was insulated with asbestos tape and was heated electrically.

A charge consisting of a mixture of benzene and ethyl mercaptan was passed downwardly through the reactor. The charge first passed through a bed 18 inches in length consisting of 0.25 inch Berl saddles superimposed on the bed of catalyst in the reactor, in order to preheat the charging mixture. The charge then passed through the catalyst bed which was 22.5 inches long. In each of the runs conducted the gauge pressure was maintained at 350 pounds per square inch and the molal ratio of benzene to ethyl mercaptan was 4. After passage through the catalyst the reaction products were cooled to room temperature before release of pressure and then were passed through a scrubber countercurrent to a 12% sodium carbonate solution in order to remove hydrogen sulfide. The liquid was separated from the gases and the gases were further scrubbed with a 15% sodium hydroxide solution to remove mercaptan. The resulting liquid and gaseous products were then analyzed. The conditions under which the runs were made and the results obtained are set forth in the following table.

Table

|  | Run No. | | | | |
|---|---|---|---|---|---|
|  | 20 | 21 | 22 | 23 | 24 |
| Reaction temp., °C | 384 | 372 | 398 | 384 | 405 |
| Press., pounds per sq. in. ga | 350 | 350 | 350 | 350 | 350 |
| Space velocity | 211.0 | 211.0 | 209.8 | 207.0 | 208.4 |
| Charge: | | | | | |
| g./1 hr | 176.1 | 176.1 | 175.1 | 172.7 | 173.9 |
| Total g | 880.5 | 880.5 | 875.5 | 863.5 | 869.5 |
| Wt. per cent $C_6H_6$ | 83.39 | 83.39 | 83.39 | 83.39 | 83.39 |
| Wt. per cent $C_2H_5SH$ | 16.59 | 16.59 | 16.59 | 16.59 | 16.59 |
| Wt. per cent $H_2O$ | 0.02 | 0.02 | 0.02 | 0.02 | 0.02 |
| Mole ratio, $C_6H_6:C_2H_5SH$ | 4.00 | 4.00 | 4.00 | 4.00 | 4.00 |
| Liquid product recovered, g | 745.9 | 728.6 | 750.1 | 726.4 | 667.2 |
| Wt. per cent $C_6H_6$ | 71.7 | 77.7 | 78.4 | 74.2 | 79.1 |
| Wt. per cent $C_6H_5C_2H_5$ | 18.3 | 13.1 | 14.0 | 9.2 | 8.2 |
| Yield of $C_6H_5C_2H_5$ on total charge in wt. per cent | 16.7 | 12.3 | 13.0 | 8.5 | 7.4 |
| Per cent conversion of $C_2H_5SH$ to: | | | | | |
| $C_6H_5C_2H_5$ | 59.0 | 43.5 | 45.8 | 30.1 | 26.1 |
| $C_2H_4$ | 1.1 | 2.1 | 3.3 | 4.3 | 4.0 |
| $(C_2H_5)_2S$ | 0 | 1.5 | 0.9 | 0.8 | 1.7 |
| $H_2$ | 0.22 | 0.09 | 0.18 | 0.08 |  |
| $H_2S$ | 23.8 | 10.1 | 14.4 | 33.7 | 46.6 |

It will be seen from the results in the table that in run 20 at a temperature of 384° C. and a space velocity of 211.0, a yield of 59% of ethyl benzene based on the mercaptan charged was obtained. It is also apparent from the runs in the table that under the conditions of the reaction as the temperature increased the yield of ethyl benzene decreased and the formation of hydrogen sulfide increased. These runs demonstrate that high yields of ethyl benzene can be obtained at temperatures of about 375° to 400° C.

The catalyst gradually loses activity due to formation of tarry or carbonaceous layer on the catalyst. The catalyst must, therefore, be periodically renewed or reactivated by controlled oxidation with air.

It will be seen, therefore, that we have discovered a method whereby alkyl benzenes may be readily prepared in high yields from benzene and alkyl mercaptans and/or sulfides.

We claim:

1. The method of preparing alkylated carbocyclic compounds comprising contacting carbocyclic compounds susceptible to alkylation in admixture with a compound selected from the group consisting of alkyl mercaptans and alkyl sulfides with copper pyrophosphate at a temperature of approximately 200–525° C.

2. Method in accordance with claim 1 in which the temperature is between approximately 300° C. and 425° C.

3. Method in accordance with claim 1 in which the copper pyrophosphate is supported on activated charcoal.

4. The method of preparing alkylated carbocyclic compounds which comprises contacting a mixture of a carbocyclic compound susceptible to alkylation and a compound selected from the group consisting of alkyl mercaptans and alkyl sulfides with copper pyrophosphate at temperatures of approximately 300° to 425° C. under pressures of approximately 100–500 pounds per square inch.

5. Method in accordance with claim 4 in which the copper pyrophosphate is supported on activated charcoal.

6. The method of alkylating benzene which comprises contacting a mixture of benzene and a sulfur compound selected from the group consisting of alkyl mercaptans and alkyl sulfides with copper pyrophosphate at a temperature of approximately 200–525° C.

7. Method in accordance with claim 6 in which the sulfur compound is ethyl mercaptan.

8. Method in accordance with claim 6 in which the sulfur compound is a propyl mercaptan.

9. Method in accordance with claim 6 in which the temperature is between approximately 300° and 425° C.

10. Method in accordance with claim 6 in which the copper pyrophosphate is supported on activated charcoal.

11. Method in accordance with claim 6 in which the space velocity is approximately 10 to 1000.

12. The method of alkylating benzene which comprises contacting a mixture of benzene and an alkyl mercaptan in which the molal ratio of benzene to mercaptan is greater than 1 to 1, with copper pyrophosphate at a temperature of approximately 300–425° C. and a pressure between approximately 250 and 500 pounds per square inch.

13. Method in accordance with claim 12 in which the copper pyrophosphate is supported on activated charcoal.

14. Method in accordance with claim 12 in which the mercaptan is ethyl mercaptan and the molal ratio of benzene to ethyl mercaptan is about 4 to 1.

15. Method in accordance with claim 12 in which the space velocity is approximately 10 to 1000.

16. The method of preparing ethyl benzene which comprises passing a mixture of benzene and ethyl mercaptan at a temperature of approximately 375°–400° C. and a pressure of approximately 350 pounds per square inch through a bed of catalyst comprising activated carbon impregnated with copper pyrophosphate.

17. Method in accordance with claim 16 in which the molal ratio of benzene to ethyl mercaptan is approximately 4 to 1 and the space velocity is approximately 210.

CARLISLE M. THACKER.
RICHMOND T. BELL.